United States Patent
Nalbach

(10) Patent No.: US 7,117,987 B2
(45) Date of Patent: Oct. 10, 2006

(54) ARTICLE ORIENTATING APPARATUS

(75) Inventor: John C. Nalbach, Oak Brook, IL (US)

(73) Assignee: John R. Nalbach Engineering Co., Inc., Countryside, IL (US)

( * ) Notice: Subject to any disclaimer, the term of this patent is extended or adjusted under 35 U.S.C. 154(b) by 79 days.

(21) Appl. No.: 10/979,978

(22) Filed: Nov. 2, 2004

(65) Prior Publication Data

US 2006/0090984 A1    May 4, 2006

(51) Int. Cl.
*B65G 47/14*      (2006.01)

(52) U.S. Cl. ............. 198/393; 198/397.04; 198/397.05

(58) Field of Classification Search ................. 198/393, 198/396, 397.02, 397.03, 397.01, 377.04, 198/377.08, 397.04, 397.05
See application file for complete search history.

(56) References Cited

U.S. PATENT DOCUMENTS

| | | | |
|---|---|---|---|
| 1,823,995 A | 9/1931 | Streby | |
| 2,538,706 A | 1/1951 | Reynolds | |
| 2,754,954 A | 7/1956 | Kasper | |
| 2,776,047 A | 1/1957 | Howard | |
| 3,285,387 A | 11/1966 | Ochs | |
| 3,318,434 A * | 5/1967 | Waller | 198/393 |
| 3,338,373 A | 8/1967 | Aidlin | |
| 3,446,335 A | 5/1969 | Dubuit | |
| 3,464,535 A * | 9/1969 | Eissele et al. | 198/397.04 |
| 3,517,796 A * | 6/1970 | Aidlin et al. | 198/397.05 |
| 3,543,909 A | 12/1970 | Ueda | |
| 3,624,773 A | 11/1971 | Krooss | |
| 3,650,368 A | 3/1972 | Nalbach | |
| 3,662,872 A | 5/1972 | Nalbach | |
| 3,791,553 A * | 2/1974 | Aidlin et al. | 198/393 |
| 3,826,405 A | 7/1974 | Hoppman | |
| 3,948,386 A | 4/1976 | Nalbach | |
| 4,130,194 A | 12/1978 | Schindel | |
| 4,238,023 A * | 12/1980 | Millar et al. | 198/393 |
| 4,578,001 A | 3/1986 | Ochs | |
| 4,681,209 A | 7/1987 | Marti | |
| 4,705,156 A | 11/1987 | Boling | |
| 4,825,995 A | 5/1989 | Nalbach | |
| 4,865,181 A | 9/1989 | Nalbach | |
| 5,297,666 A * | 3/1994 | Marti Sala | 198/397.05 |
| 5,769,203 A * | 6/1998 | Marti Sala | 198/397.01 |

FOREIGN PATENT DOCUMENTS

| | | |
|---|---|---|
| DE | 3442612 A1 | 6/1985 |
| GB | 1558379 | 12/1979 |

(Continued)

*Primary Examiner*—James R. Bidwell
(74) *Attorney, Agent, or Firm*—Anthony S. Zummer

(57) ABSTRACT

An apparatus for orienting random oriented lightweight articles. The apparatus includes a wheel which rotates on an axis which is substantially horizontal. A plurality of alignment troughs is mounted on the interior of the wheel. Each of the alignment troughs has a longitudinal axis substantially parallel to the wheels horizontal axis. Each trough has a plurality of openings to allow air to pass through the trough and out of the wheel to hold lightweight articles in the troughs against the force of gravity. Each of the articles has a longitudinal axis which is parallel to the troughs longitudinal axis. Rotation of the wheel selectively positions the troughs with a source of air under pressure to move the articles to the end of the respective trough. Each article at the end of its respective trough moves into an external receiver where the article is transferred to a vertical attitude. A retriever positioned adjacent to the wheel retrieves each article in a vertical attitude and delivers each article to a conveyor.

30 Claims, 8 Drawing Sheets

FOREIGN PATENT DOCUMENTS

| | | |
|---|---|---|
| JP | 60048820 | 3/1985 |
| JP | 61166419 | 7/1986 |

* cited by examiner

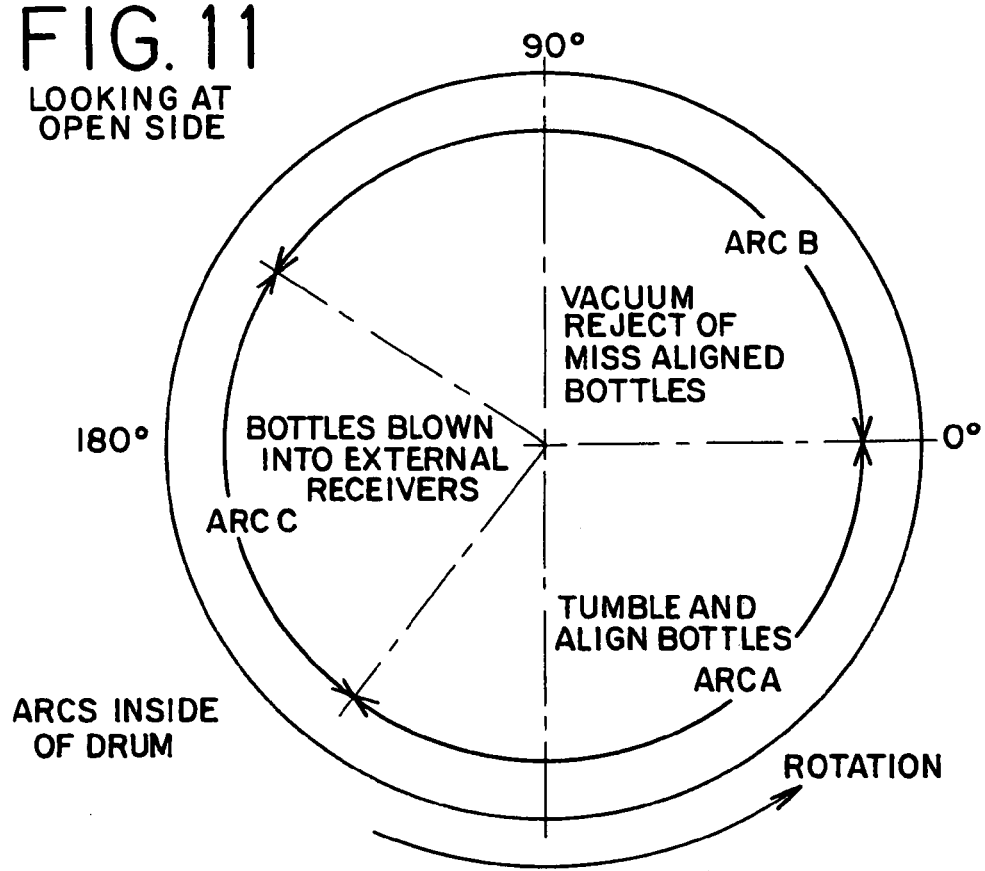
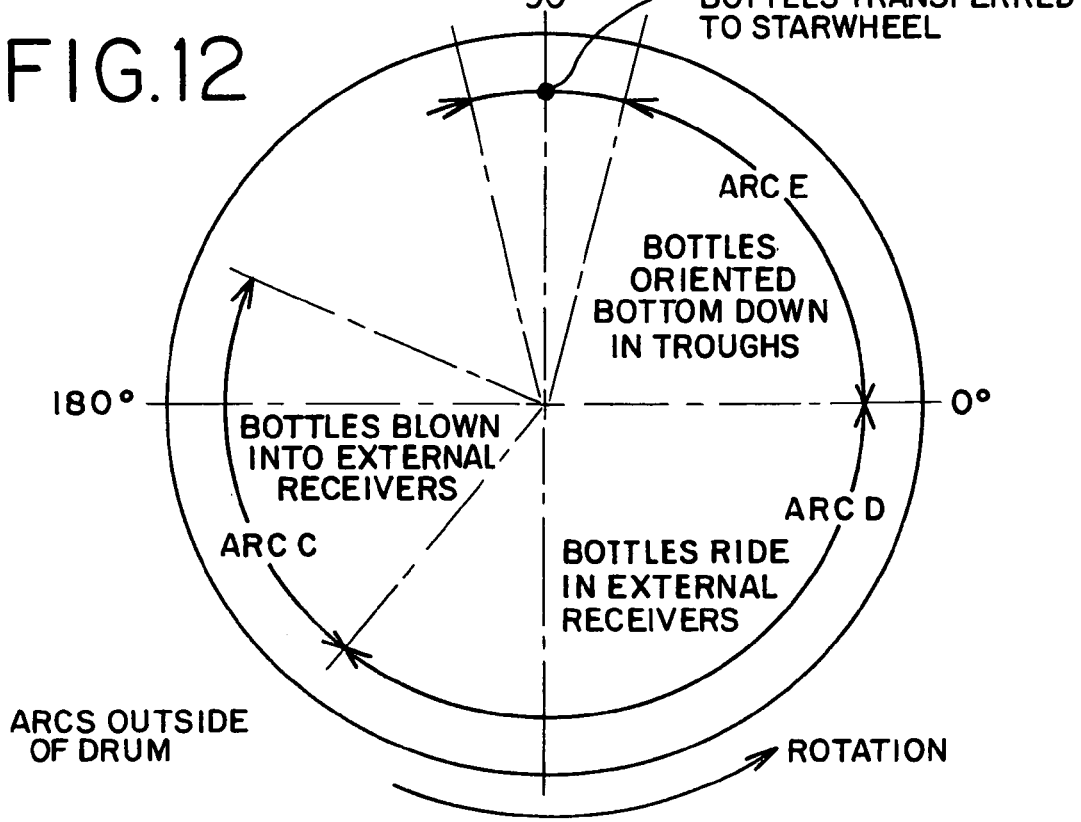

ARTICLE ORIENTATING APPARATUS

FIELD OF THE INVENTION

This invention relates to that class of machines which orient lightweight articles into a vertical attitude from a group of randomly oriented articles.

BACKGROUND OF THE INVENTION

Lightweight plastic bottles or containers have been accepted for containing a myriad of liquids from drinking water to cleaning solutions. The plastic containers are customarily made in a machine which expels the containers in a random orientation. Modern day filling machines require that containers to be filled be aligned in a vertical attitude. Machines for orientating articles of this type are well known. A machine typical of this class of machines is disclosed in U.S. Pat. No. 3,650,368, entitled, "Article Orientating Apparatus" issued Mar. 21, 1972, and invented by the inventor of the instant improvement, John C. Nalbach. He is also the inventor of the subject matter of U.S. Pat. No. 3,662,872, entitled, "Apparatus for Orientating and Feeding Articles" issued May 16, 1972; U.S. Pat. No. 3,948,386, entitled, "Apparatus for Orientating and Feeding Articles"; and U.S. Pat. No. 4,825,965, entitled "Article Orientating Apparatus" issued May 2, 1989.

The speed of filling machines has progressively increased so that it is necessary to increase the speed of availability of containers in a vertical attitude. It has been found that the lightweight containers being discharged from an unscrambling machine have a tendency to tip and fall over unless each container is held in a vertical attitude long enough to stabilize the container as it leaves the unscrambling machine. The generally accepted construction for an unscrambling machine is one which initially aligns the containers in a circle end-to-end attitude and rotates the containers to a location where they are positioned in a vertical attitude and aligned with each other. The end-to-end circular orientation of the bottles requires rotation of the unscrambler at a high rate to increase the rate of output of aligned containers. The increased rate of rotation increases cyntrifical forces which must be overcome to stabilize the containers in a vertical attitude.

SUMMARY OF THE INVENTION

The present invention provides an improved apparatus for orientating lightweight articles, such as empty lightweight plastic bottles. The apparatus generally includes a wheel which rotates on a horizontal axis. The wheel has a plurality of alignment troughs on the interior surface of the wheel. Each of the troughs has a longitudinal axis which is parallel to the horizontal axis of the wheel. Each trough has a length sufficiently great to receive a plurality of articles in an end-to-end attitude. Each trough has a plurality of openings which allows air to pass through the trough and out of the wheel. A plurality of randomly orientated articles is continuously loaded into the interior of the wheel so that the rotation of the wheel causes the articles to fall into selected troughs. The articles each have their respective longitudinal axis aligned with the longitudinal axis of the trough, as well as the horizontal axis of the wheel. Rotation of the wheel carries the articles in the troughs upward. A hood is mounted on the exterior of the wheel drawing air into the troughs to hold the articles in their respective troughs against the force of gravity. The rotation of the wheel selectively positions the troughs aligned with a source of air under pressure to move the articles to the end of the trough where the article in the end of the trough moves into an external receiver where the article is aligned in a vertical attitude with the bottom of the article down. The article is carried in a chute to an article retriever which retrieves each article in each chute and delivers the article to a conveyor in a vertical and stable attitude.

BRIEF DESCRIPTION OF THE DRAWINGS

FIG. 11 is a chart showing the actions inside of the wheel; and

FIG. 12 is a chart showing the actions of the articles on the outside of the wheel.

DETAILED DESCRIPTION OF THE PREFERRED EMBODIMENT

Figure 1:
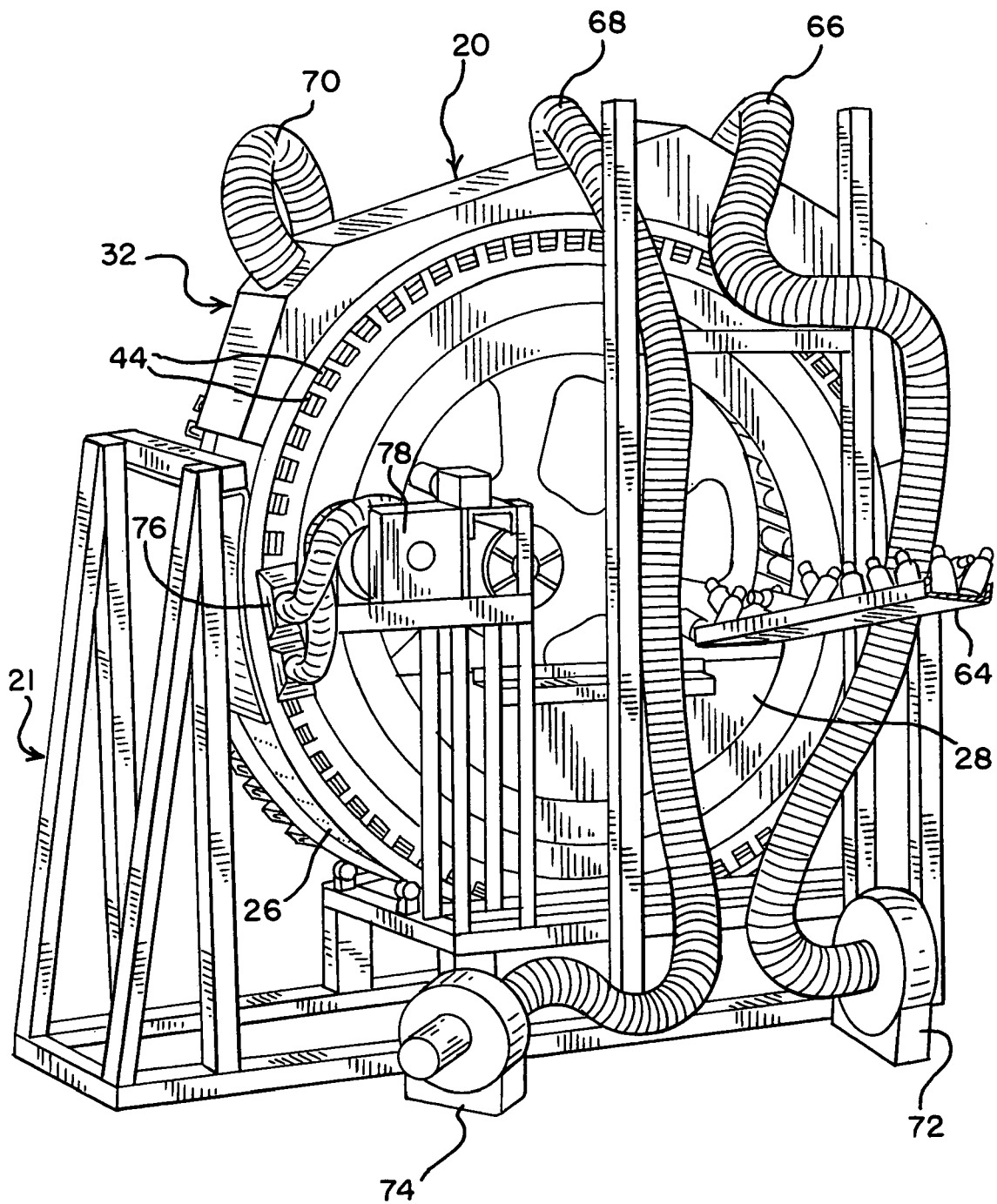
FIG. 1 is a perspective view of an article orientating apparatus embodying the present invention.
Figure 2:
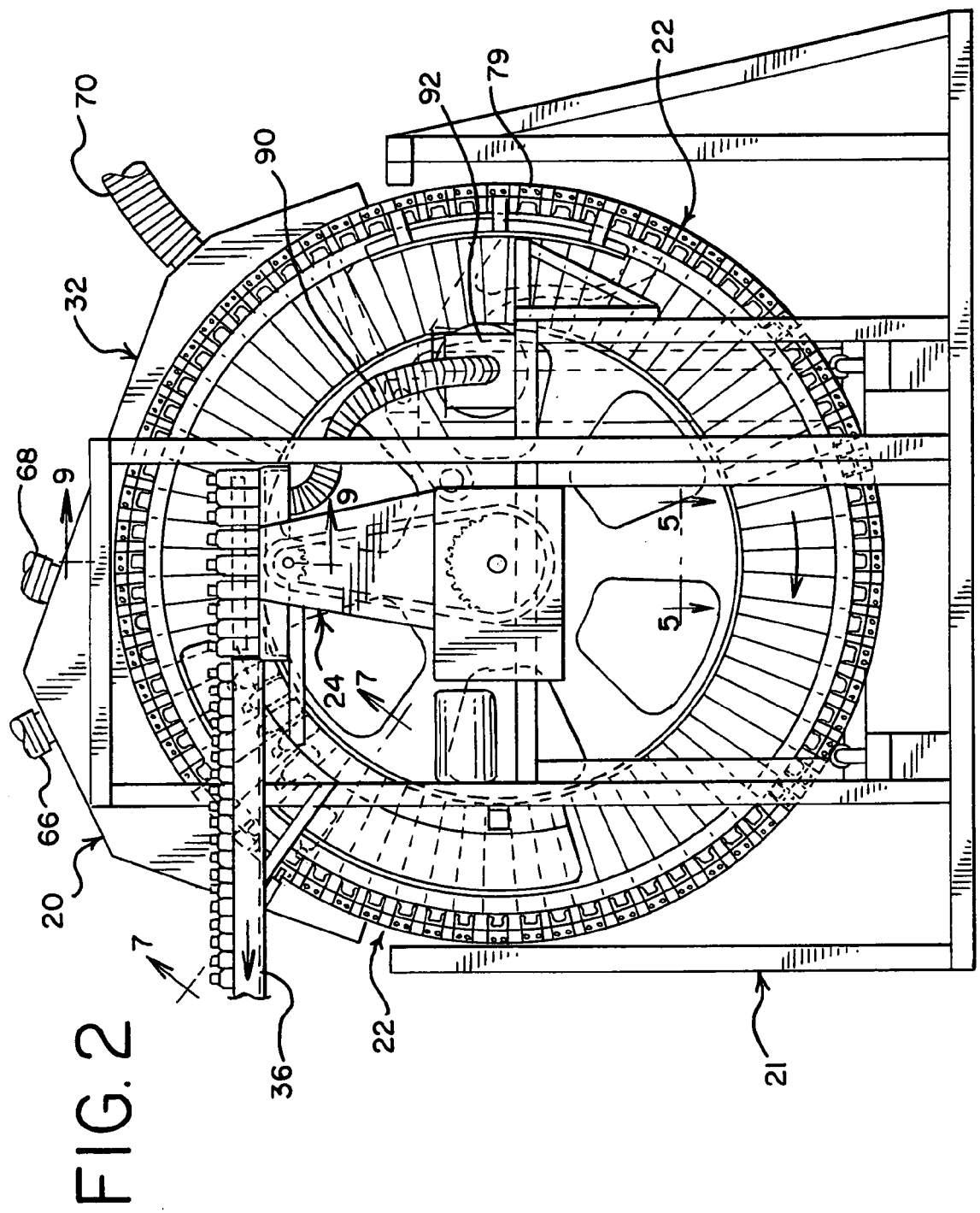
FIG. 2 is a side elevational view of the apparatus of FIG. 1, showing the discharge side of the apparatus.
Figure 3:
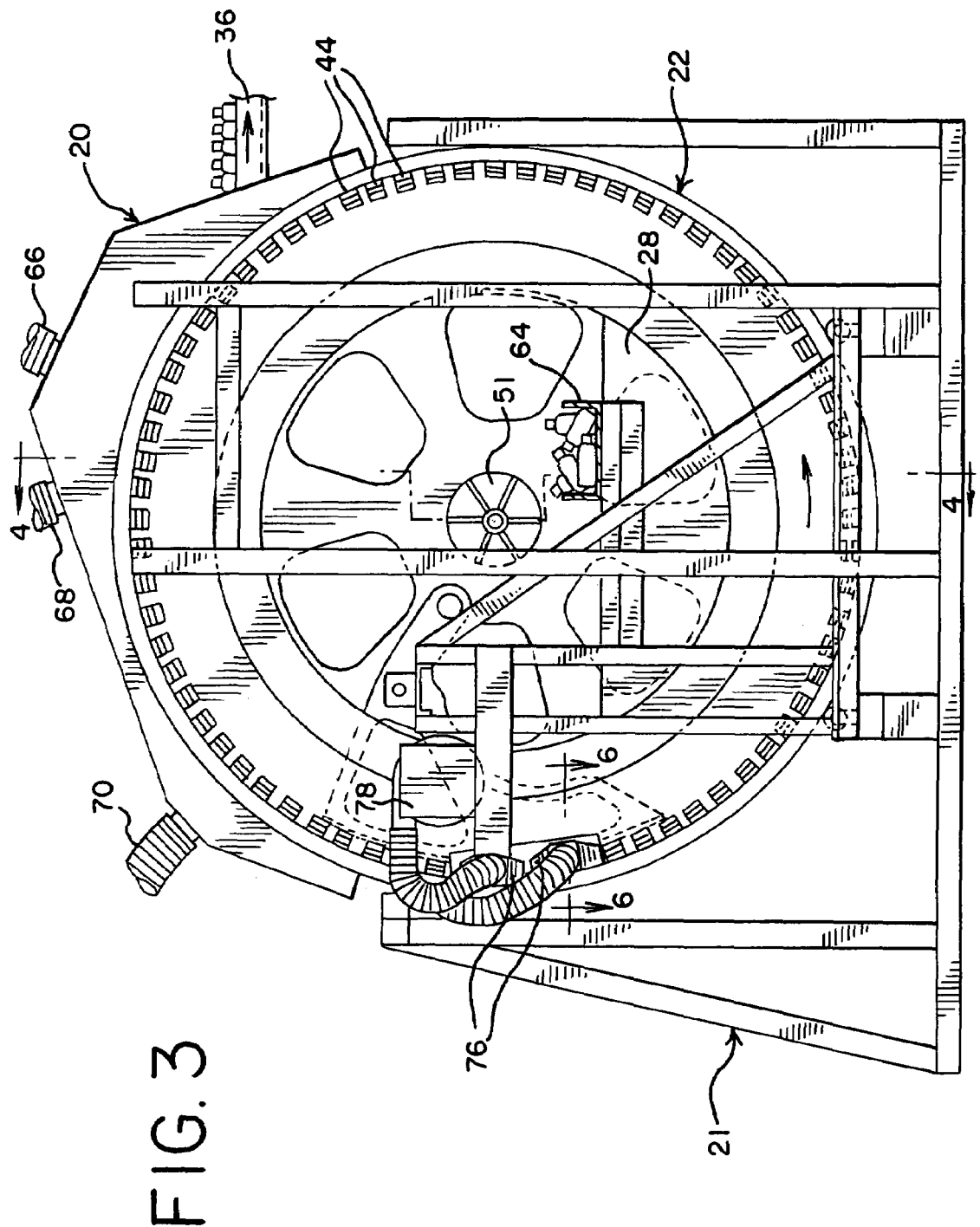
FIG. 3 is a side elevational view of the side opposite to that shown in FIG. 2 showing the loading side of the apparatus.

Referring now to the drawings, and especially to FIG. 1, an apparatus for orienting lightweight articles sometimes referred to as an unscrambler is shown therein generally indicated by numeral 20 and is a specific embodiment of the instant invention. The present unscrambler is used to orient and align lightweight articles, and in this instance in particular, lightweight plastic bottles or containers. The unscrambler 20 generally includes a conventional frame 21 supporting a wheel or drum 22 which is driven on a horizontal wheel axis by a drive assembly 24. Wheel 22 has a continuous outer periphery 26. The wheel has a retention sidewall 28 on its loading side and means for transferring an article to a vertical attitude including a plurality of chutes 30 on its discharge side. A hood 32 is positioned above wheel 22 and extends for an arc of approximately 135° of the outer periphery of the wheel, as shown in FIGS. 2 and 3.

A retriever in the form of star wheel 34 is mounted adjacent to the wheel to retrieve from each chute a bottle 35 having its longitudinal axis in a vertical attitude and move the bottle to a discharge conveyor 36, where the bottles are aligned.

A plurality of identical alignment troughs 38 is mounted on the wheel's interior periphery. Each of the troughs 38 has a longitudinal trough axis parallel to the horizontal wheel axis. Each trough has a width which is slightly greater than the width of each of the bottles 35. The length of the trough is sufficient to receive a plurality of bottles 35. Periphery 26 has a plurality of elongated vents 42 opening into each of the troughs. Retention sidewall 28 has pusher ports 44 aligned with the ends of the alignment troughs as the wheel rotates the troughs past the port. The other side of wheel 22 has a support side plate 46 which has chutes 30 mounted thereon. Support plate 46 has an internal receiver 47 with an article aperture 48 aligned with each alignment trough so that an article may pass through the opening to its respective chute 30.

The drive assembly includes a main drive shaft 50 which has one end fixed to plate 46 at a connector cap 51 to support the wheel. The main drive shaft 50 provides a horizontal axis for the wheel about which the wheel rotates. A conventional electric gear motor 52 drives main drive shaft 50. A sprocket 54 on the end of the drive shaft drives a chain 56 which engages a sprocket 58 mounted on a take-off shaft 60. Take-off shaft 60 drives a conventional retriever star wheel 34.

Figure 4:
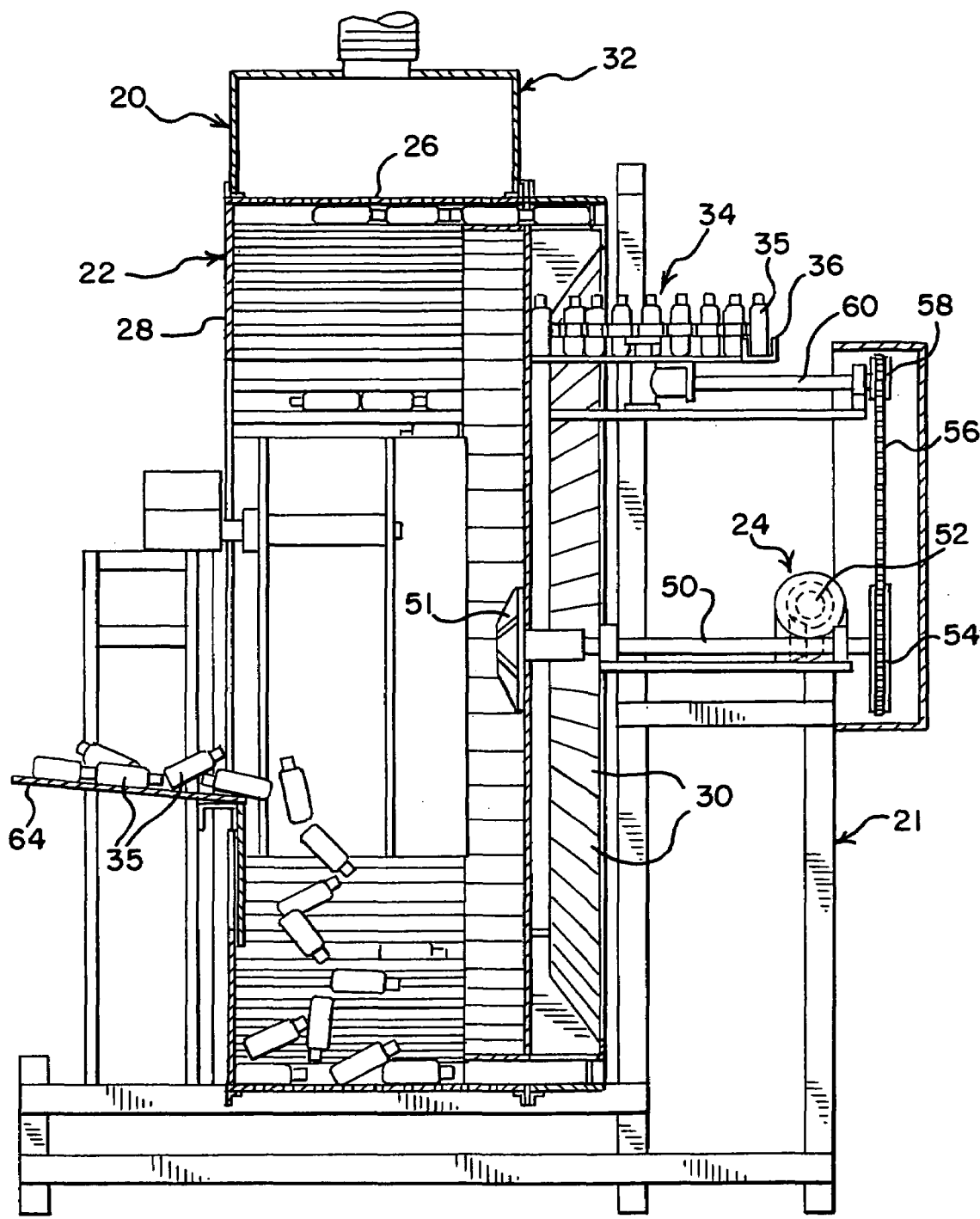
FIG. 4 is a cross sectional view of the apparatus of FIG. 1 taken on line 4—4 of FIG. 3 showing the loading of articles into a wheel and retrieving of the articles from the wheel.
Figure 5:
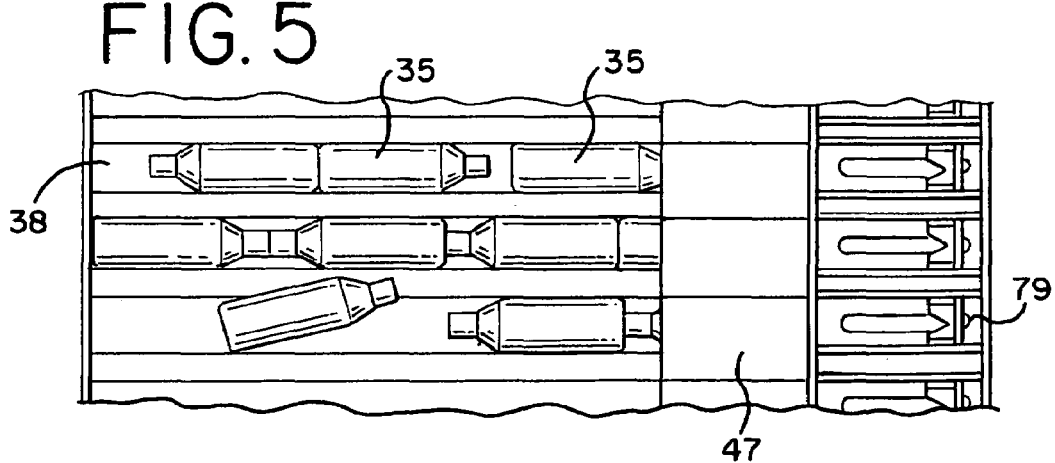
FIG. 5 is taken on line 5—5 of FIG. 2 showing a plan view of a portion of a plurality of alignment troughs with articles in the troughs.

As shown in FIGS. 1 and 4, bottles 35 are introduced into the interior of the wheel 22 through a chute 64. The bottles are randomly orientated and fall into the interior of the wheel in a random manner. The rotation of the wheel causes the bottles to move about in a random manner and bottles drop into an alignment trough with the longitudinal axis of each bottle parallel to the longitudinal axis of the trough and the horizontal axis of the wheel. The bottles in the troughs are initially held in the troughs by gravity for the arc of rotation of the wheel identified as Arc A in FIG. 11. As the wheel turns, the bottles would have a tendency to fall out of the troughs. Hood 32 is connected by hoses 66, 68, and 70 to blowers which evacuate air from hood 32. Blowers 72 and 74 are shown connected to hoses 66 and 68, respectively. The blower connected to hose 70 is not shown herein, but is a conventional and has well known construction.

The evacuation of the air from hood 32 creates a flow of air into the interior of the wheel and out through openings 42 in each of the troughs. The continuous flow of air through openings 42 causes the lightweight bottles to be held in their respective troughs against the force of gravity during the arc of rotation of the wheel identified as Arc B in FIG. 11. Thus, any bottles which are not in a trough fall back down into the bottom of the wheel to be mixed and possible positioning in an alignment trough.

The bottles in the troughs are carried to the location of ports 44 by the rotation of the wheel. A pair of pressure manifolds 76 is positioned over ports 44 so that air under pressure from conventional blower 78 blows air into ports 44 as the wheel rotates through Arc C as shown in FIGS. 11 and 12, so that there is a selective application of air under pressure to the troughs. The air from the pressure manifold 76 blows along the length of troughs to cause the bottles to move longitudinally in the respective alignment troughs. This longitudinal movement causes the bottle closest to the exit side of the wheel to be pushed into a respective external receiver 79. Each of the alignment troughs is long enough to receive several bottles in an end-to-end attitude.

Figure 6:
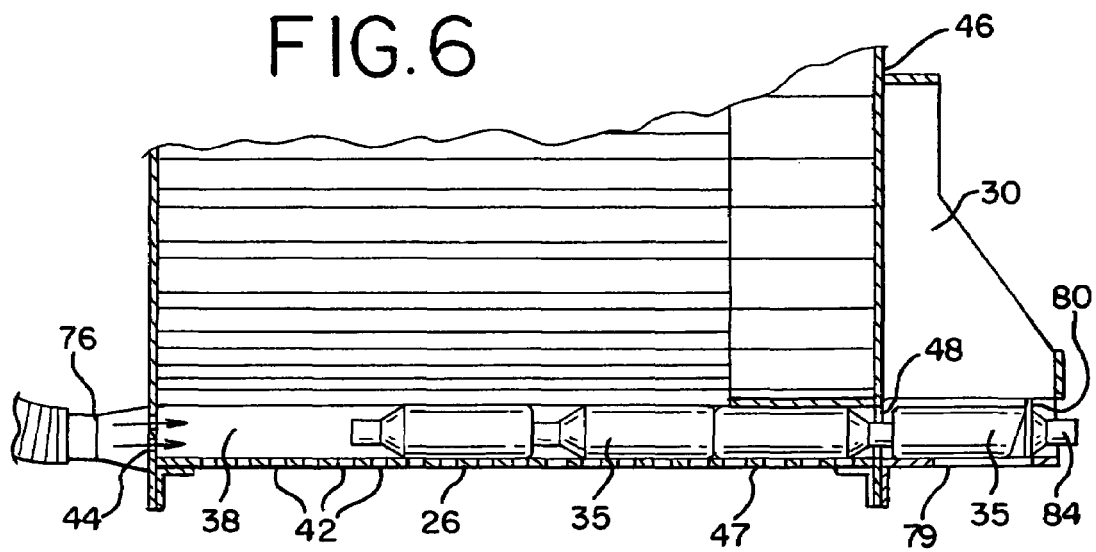
FIG. 6 is taken on line 6—6 of FIG. 3 being a cross sectional view showing articles moving along an alignment trough to an external receiver with an article in an external receiver leading with its neck.
Figure 6A:
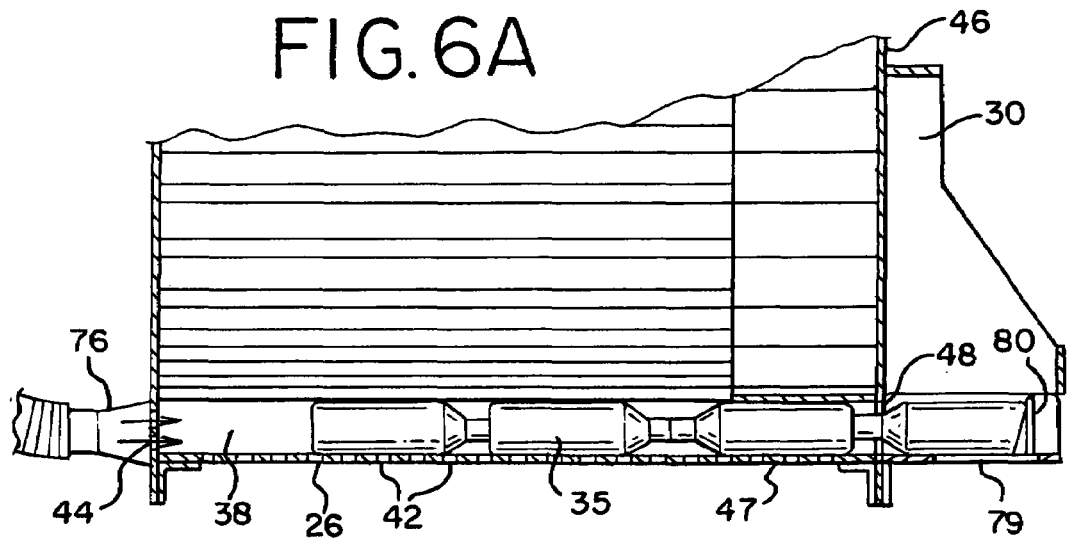
FIG. 6A is a cross sectional view like FIG. 6, but with an article in the external receiver leading with its bottom.

If there is only one bottle in the trough, air under pressure from ports 44 carries that bottle into the external receiver 79. The bottle is discharged from the external receiver, as described below, so that that trough is emptied. Rotation of the wheel carries the empty trough to the bottom of the wheel's path of travel to accept one or more bottles in the trough. When there is more than one bottle in a trough and there is no bottle in the internal receiver 47, the air under pressure from ports 44 carries a bottle into the external receiver and the next bottle into the internal receiver. The bottle in the external receiver is discharged, as described below, while the bottle in the internal receiver remains in position. Rotation of the wheel carries the trough with the bottle in the internal receiver to the bottom of the wheel's path to accept at least one more bottle into that trough. When there is a bottle in the internal receiver and one or more additional bottles in a trough, the air under pressure from ports 44 carries the bottle in the internal receiver into the external receiver and the next bottle into the internal receiver to achieve the condition shown either in FIG. 6 or FIG. 6A during rotation of the wheel through Arc D shown in FIG. 12. FIG. 6 shows the bottle having entered the external receiver neck first while FIG. 6A shows the bottle having entered the external receiver bottom first.

Figure 7:
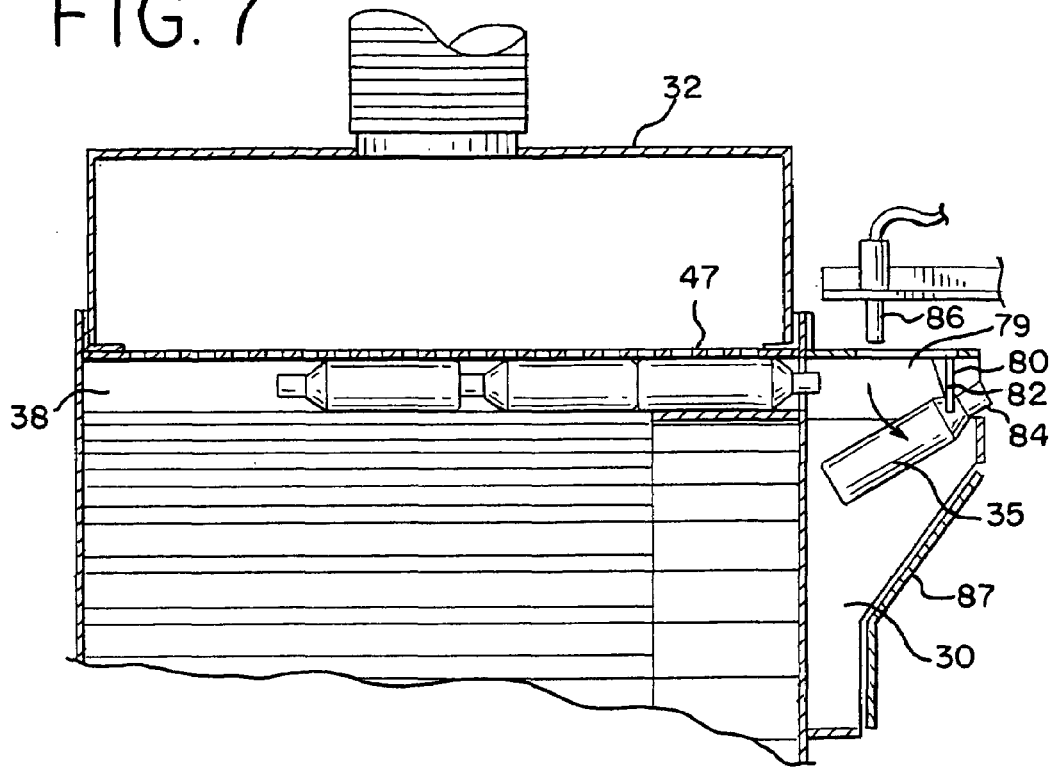
FIG. 7 is taken on line 7—7 of FIG. 2 showing a cross sectional view with an article moving from an attitude parallel to the horizontal axis of the wheel to an attitude perpendicular to the horizontal axis of the wheel.

It is immaterial as to whether the neck of the bottle leads or whether the bottom of the bottle leads one specific means for transferring an article from parallel to perpendicular to the longitudinal axis of the wheel is shown herein. The differences in discharge of a bottle from the external receiver during rotation of the wheel through Arc E of FIG. 12 may be seen in FIGS. 7 and 8, as described below. Referring now to FIG. 7, a bottle with its neck leading passes through the opening into the external receiver toward to a transition apparatus 80. The transition apparatus has an opening 82 which receives neck 84 of the neck leading bottle 35. Gravity pulls the bottle down so that the bottom moves downward first. An air jet 86 is mounted adjacent to chutes 30 to assist downward movement of the bottle. The air jet pushes the bottle down to engage a chute wall 87 and to hold the bottle upright.

Figure 8:
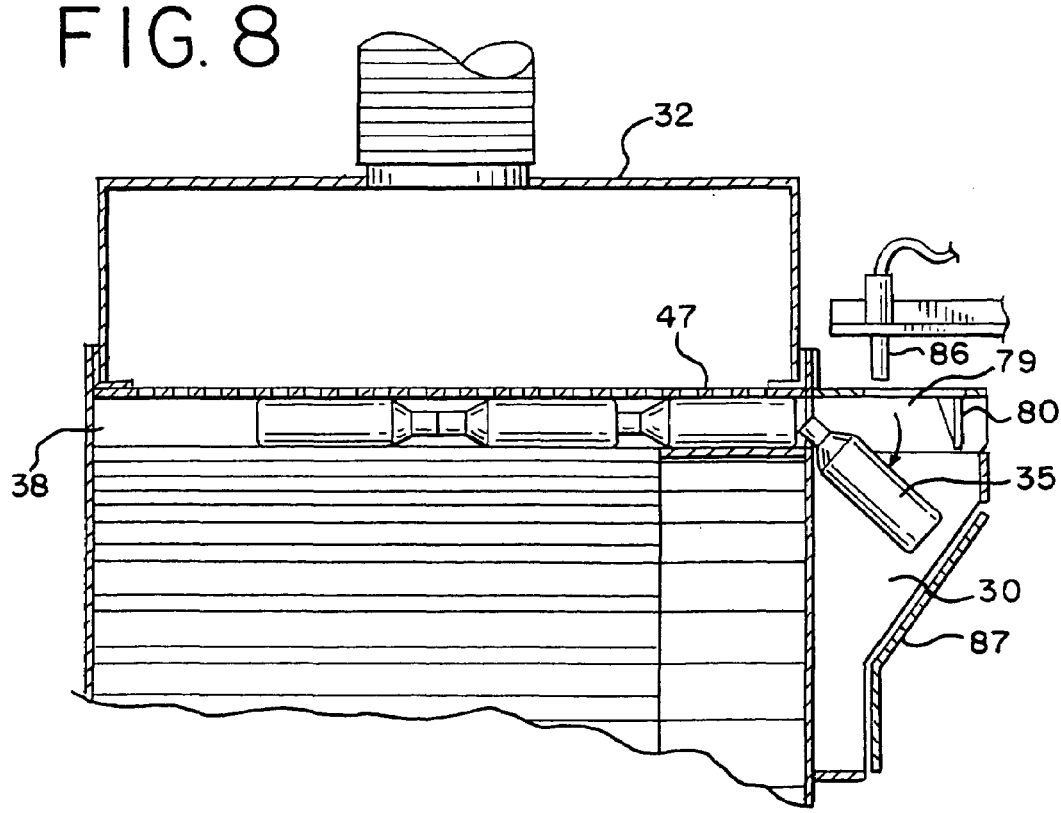
FIG. 8 is similar to FIG. 7, but showing an article in transition where the article is discharged from the trough bottom first.
Figure 9:
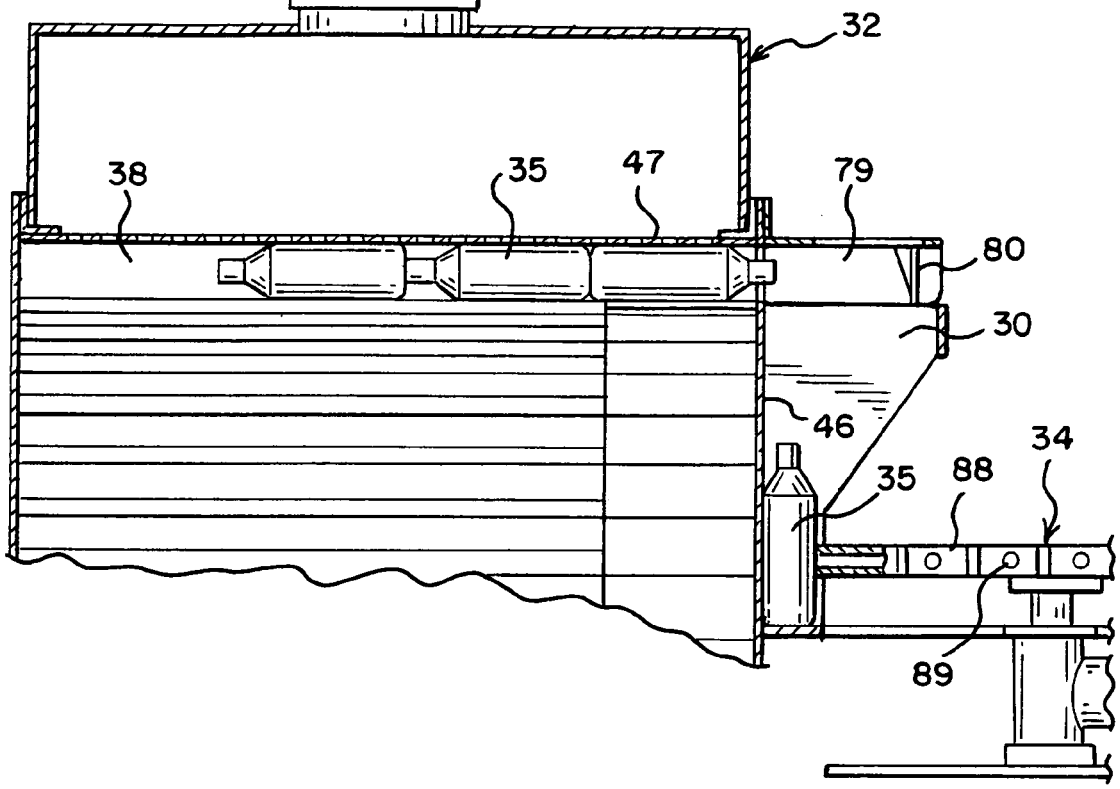
FIG. 9 is taken on line 9—9 of FIG. 2 showing a cross sectional view with an article being retrieved from the wheel.
Figure 10:
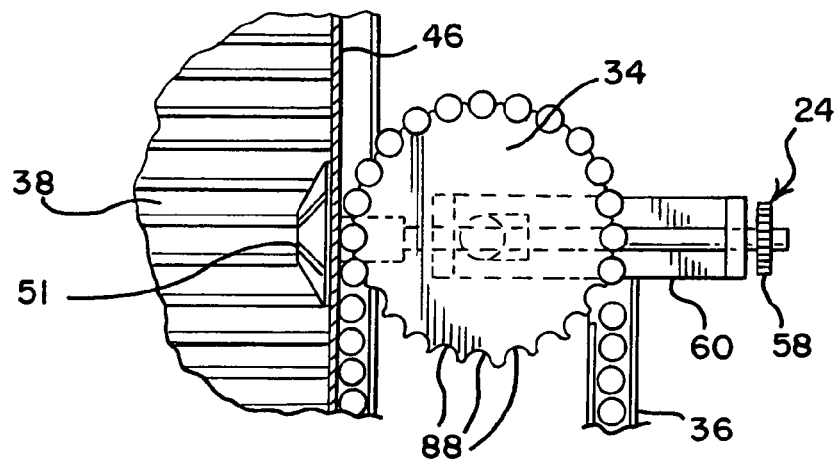
FIG. 10 is a plan view of a star wheel which is used to retrieve articles from the wheel.

Referring now to FIG. 8, a bottle entering the external receiver bottom first engages the transition apparatus 80. The neck of the bottles rests on the edge of the opening so that the bottom is pulled downward by gravity. The jet 86 pushes the bottle downward so that the bottom of the bottle moves downward first.

Each of the bottles in chutes 30 move upward until a bottle engages a pocket 88 in the retrieval apparatus star wheel 34 during rotation of the wheel through Arc F of FIG. 12. Star wheel 34 rotates in a synchronize action with wheel 22 in a well known means through the drive assembly. The star wheel has ports 89 connected to a hose 90 which in turn is connected to a blower 92. The blower 92 reduces the air pressure in pockets 88 so that the bottles are held in the pockets. As the star wheel turns, the bottles are stabilized and are then delivered in a stable vertical attitude to discharge conveyor 36 for delivery to the next operation, such as filling.

The present arrangement of the wheel rotating about a horizontal axis with alignment troughs parallel to the horizontal wheel axis allows a large number of articles to be aligned. The movement of the articles from an attitude parallel to the horizontal wheel axis to an attitude wherein the articles are perpendicular to the horizontal wheel axis is accomplished with a minimum of movement of the articles for one attitude to the next attitude.

The length of the alignment troughs is sufficiently great to accommodate a plurality of articles. Thus, there is always an article in the alignment trough with each rotation of the wheel. This construction allows the efficiency of the present apparatus is increased over the prior art unscramblers.

Although the invention has been described in detail above, it is readily apparent that those skilled in the art may make various modifications and changes in the instant invention without departing from the spirit and scope of the present invention. It is to be expressly understood that the instant invention is limited only by the appended claims.

What is claimed is:

1. An apparatus for orienting lightweight articles comprising; a wheel rotatable on a substantially horizontal wheel axis, said wheel having an intake portion for receiving randomly oriented lightweight articles, each of said articles having an article longitudinal axis, said wheel having a plurality of alignment troughs on its interior surface, each of said troughs having a trough longitudinal axis substantially parallel to the horizontal wheel axis, a hood covering a portion of the wheel to carry away air from the interior of the wheel to retain lightweight articles in their respective troughs, means for transferring an article from a respective trough in an attitude having its article longitudinal axis substantially parallel to the horizontal wheel axis to an attitude having its article longitudinal axis substantially perpendicular to the horizontal wheel axis, and a retrieval apparatus positioned adjacent to the wheel to remove from the wheel articles in a substantially vertical attitude.

2. An apparatus for orienting lightweight articles as defined in claim 1, wherein the means for transferring an article includes, a source of air under pressure to flow air selectively along each alignment trough to move an article lengthwise along the trough, and a chute mounted on the wheel to receive an article from the alignment trough and position the article adjacent to the retrieval apparatus for removal from the chute.

3. An apparatus for orienting lightweight articles as defined in claim 1, wherein each of the lightweight articles is the same size as each of the other lightweight articles, each of said alignment troughs having a length great enough to receive two of the lightweight articles aligned end to end in the trough.

4. An apparatus for orienting lightweight articles as defined in claim 1, wherein each of the lightweight articles is the same size as each of the other lightweight articles, said means for transferring an article includes, an external receiver supported on the wheel to move with the wheel, each external receiver having a transition member engageable with an article in the external receiver to allow a bottom of the article to be selectively positioned.

5. An apparatus for orienting lightweight articles as defined in claim 1, wherein the means for transferring an article includes, an external receiver aligned with each alignment trough and supported on the wheel to move with the wheel, and each external receiver having a transition member for engagement with an article in the receiver to allow a bottom of the article to be selectively positioned.

6. An apparatus for orienting lightweight articles as defined in claim 1, wherein the means for transferring an article includes, a source of air under pressure to flow selectively along each alignment trough to move articles along the trough, an external receiver aligned with each alignment trough and supported by the wheel for movement with the wheel to receive an article from the trough, and each external receiver having a transition member for engaging an article in the receiver to allow a bottom of the article to be selectively positioned.

7. An apparatus for orienting lightweight articles as defined in claim 1, wherein the means for transferring an article includes, an external receiver aligned with each alignment trough and supported on the wheel for movement with the wheel, each external receiver having a transition member for engaging an article in the receiver to allow a bottom of the article to be selectively positioned, and a source of air under pressure to apply air under pressure to an article in the external receiver to move the article to an attitude wherein the article longitudinal axis is substantially perpendicular to the horizontal wheel axis.

8. An apparatus for orienting lightweight articles as defined in claim 1, wherein the means for transferring an article includes, an external receiver aligned with each alignment trough and supported on the wheel for movement with the wheel, each external receiver having a transition member for engaging an article in the receiver to allow a bottom of the article to be selectively positioned, and a chute mounted on the wheel adjacent to each external receiver to receive an article from the external receiver.

9. An apparatus for orienting lightweight articles as defined in claim 1, wherein the means for transferring an article includes, a source of air under pressure to flow selectively along each alignment trough to move an article lengthwise along the trough to expel the article from the trough, and a second source of air under pressure to apply air under pressure to an article from an alignment trough to move the article from an attitude wherein the article longitudinal axis is substantially parallel to the horizontal wheel axis to an attitude substantially perpendicular to the horizontal wheel axis.

10. An apparatus for orienting lightweight articles as defined in claim 1, wherein the means for transferring an article includes, an internal receiver positioned adjacent to each trough to receive a lightweight article from its respective trough and maintain substantial parallel alignment of the longitudinal axis of the article to the horizontal wheel axis.

11. An apparatus for orienting lightweight articles as defined in claim 1, wherein the means for transferring an article includes, an internal receiver positioned adjacent to each trough to receive a lightweight article from its respective trough and maintain substantial parallel alignment of the article longitudinal axis to the horizontal wheel axis, and an external receiver aligned with each adjacent trough and supported on the wheel to move with the wheel, each external receiver having a transition member for engaging an article in the receiver to allow a bottom of the article to be appropriately positioned.

12. An apparatus for orienting lightweight articles as defined in claim 1, wherein the means for transferring an article includes, an internal receiver positioned adjacent to each trough to receive a lightweight article from its respective trough and maintain substantial parallel alignment of the article longitudinal axis to the horizontal wheel axis, and a source of air under pressure to flow air selectively along alignment troughs to move the article lengthwise along the trough.

13. An apparatus for orienting lightweight articles as defined in claim 1, wherein the means for transferring an article includes, an internal receiver positioned adjacent to each trough to receive a lightweight article from its respective trough and maintain substantial parallel alignment of the article longitudinal axis to the horizontal wheel axis, and a source of air under pressure to apply air selectively under pressure to the article to move the article from an attitude having its article longitudinal axis substantially parallel to the horizontal wheel axis to an attitude of the article longitudinal axis substantially perpendicular to the horizontal wheel axis.

14. An apparatus for orienting lightweight articles as defined in claim 1, wherein the means for transferring an article includes, an internal receiver positioned adjacent to each trough to receive a lightweight article from its respective trough and maintain substantial parallel alignment of the article longitudinal axis to the horizontal wheel axis, and a chute mounted on the wheel adjacent to each alignment trough to hold an article with the article longitudinal axis substantially perpendicular to the horizontal wheel axis.

15. An apparatus for orienting lightweight articles as defined in claim 1, wherein the means for transferring an article includes, an internal receiver positioned adjacent to each trough to receive a lightweight article from the respective trough and maintain substantial parallel alignment of the article longitudinal axis to the horizontal wheel axis, an external receiver aligned with each internal receiver and supported on the wheel to move with the wheel, a source of air under pressure to flow air selectively along the alignment trough to move an article lengthwise along the trough into the internal receiver and into the respective external receiver, and each external receiver having a transition member for engaging an article in the external receiver to allow a bottom of the article to be selectively positioned.

16. An apparatus for orienting lightweight articles as defined in claim 1, wherein the means for transferring an article includes, an internal receiver positioned adjacent to each alignment trough to receive a lightweight article from the respective trough and maintain substantial parallel alignment of the article longitudinal axis to the horizontal wheel axis, an external receiver aligned with each alignment trough and supported on the wheel for movement with the wheel, a source of air under pressure to apply air under pressure to an article in the external receiver to move the article to an attitude wherein the article the longitudinal axis is substantially perpendicular the longitudinal wheel axis, and each external receiver having a transition member for engagement with an article in the external receiver to allow a bottom of the article to be selectively positioned.

17. An apparatus for orienting lightweight articles as defined in claim 1, wherein the means for transferring an article includes, an internal receiver positioned adjacent to each trough to receive a lightweight article from the respective trough and maintain substantial parallel alignment of the article longitudinal axis to the horizontal wheel axis, an external receiver aligned with each alignment trough and supported on the wheel for movement with the wheel, each external receiver having a transition member for engagement with an article in the external receiver to allow a bottom of the article to be selectively positioned, and a chute mounted on the wheel adjacent to each external receiver to receive an article from the external receiver.

18. An apparatus for orienting lightweight articles as defined in claim 1, wherein the means for transferring an article includes, an internal receiver positioned adjacent to each trough to receive a lightweight article from the respective trough and maintain substantial parallel alignment of the article longitudinal axis to the horizontal wheel axis, an external receiver aligned with each alignment trough and supported on the wheel for movement with the wheel, a source of air under pressure to flow air selectively along each longitudinal trough to move an article along the length of the trough into the internal receiver and the external receiver, each external receiver having a transition member for engagement with an article in the external receiver to allow a bottom of the article to be selectively positioned, and a second source of air under pressure to apply air under pressure selectively to an article in the external receiver to move the article to an attitude with the article longitudinal axis substantially perpendicular to the horizontal wheel axis.

19. An apparatus for orienting lightweight articles as defined in claim 1, wherein the means for transferring an article includes, an internal receiver positioned adjacent to each alignment trough to receive a lightweight article from the respective trough and maintain substantial parallel alignment of the article longitudinal axis to the horizontal wheel, axis an external receiver aligned with each alignment trough and supported on the wheel for movement with the wheel, a source of air under pressure to move selectively an article lengthwise along the alignment trough to the internal receiver and the external receiver, each external receiver having a transition member for engagement with an article in the external receiver to allow a bottom of the article to be selectively positioned, and a chute mounted on the wheel adjacent to each external receiver to receive an article from the external receiver.

20. An apparatus for orienting lightweight articles as defined in claim 1, wherein the means for transferring an article includes, an internal receiver positioned adjacent to each alignment trough to receive a lightweight article from the respective trough and maintain substantial parallel alignment of the article longitudinal axis to the horizontal wheel axis, an external receiver aligned with each internal receiver and supported on the wheel for movement with the wheel, each external receiver having a transition member for engagement with an article in the external receiver to allow a bottom of the article to be selectively positioned, a source of air under pressure to apply air under pressure selectively to an article in the external receiver to move the article to an attitude wherein the article longitudinal axis is substantially perpendicular to the horizontal wheel axis, and a chute mounted on the wheel adjacent to each external receiver to receive an article from the external receiver in an attitude wherein the article longitudinal axis substantially perpendicular to the horizontal wheel axis.

21. An apparatus for orienting lightweight articles comprising; a wheel rotatable on a substantially horizontal wheel axis, said wheel having an intake portion for receiving randomly oriented lightweight articles, each of said articles having an article longitudinal axis, said wheel having a plurality of alignment troughs on its interior surface, each of said troughs having a trough longitudinal axis substantially parallel to the horizontal wheel axis, a hood covering a portion of the wheel to carry away air from the interior of the wheel to retain lightweight articles in their respective troughs, an external receiver mounted on the wheel aligned with each trough to receive an article from the respective trough with the article longitudinal axis substantially parallel to the horizontal wheel axis to transfer the article to an attitude having its article longitudinal axis substantially perpendicular to the horizontal wheel axis, and a retrieval apparatus positioned adjacent to the wheel to remove from the wheel articles in a substantially vertical attitude.

22. An apparatus for orienting lightweight articles as defined in claim 21, including, a source of air under pressure to flow air selectively along each alignment trough to move an article lengthwise along the trough, and a chute mounted on the wheel to receive an article from the alignment trough and position the article adjacent to the retrieval apparatus for removal from the chute.

23. An apparatus for orienting lightweight articles as defined in claim 21, wherein each of the lightweight articles is the same size as each of the other lightweight articles, each of said alignment troughs having a length great enough to receive two of the lightweight articles aligned end to end in the trough.

24. An apparatus for orienting lightweight articles as defined in claim 21, wherein each external receiver has a transition member engageable with an article in the external receiver to allow a bottom of the article to be selectively positioned.

25. An apparatus for orienting lightweight articles as defined in claim 21, including, a source of air under pressure to flow selectively along each alignment trough to move articles along the trough, and each external receiver having a transition member for engaging an article in the receiver to allow a bottom of the article to be selectively positioned.

26. An apparatus for orienting lightweight articles as defined in claim 21, wherein each external receiver has a transition member for engaging an article in the receiver to allow a bottom of the article to be selectively positioned, and a source of air under pressure to apply air under pressure to an article in the external receiver to move the article to an attitude wherein the article longitudinal axis is substantially perpendicular to the horizontal wheel axis.

27. An apparatus for orienting lightweight articles as defined in claim 21, wherein each external receiver has a transition member for engaging an article in the receiver to allow a bottom of the article to be selectively positioned, and a chute mounted on the wheel adjacent to each external receiver to receive an article from the external receiver.

28. An apparatus for orienting lightweight articles as defined in claim 21, including, a source of air under pressure to flow selectively along each alignment trough to move an article lengthwise along the trough to expel the article from the trough, and a second source of air under pressure to apply air under pressure to an article from an alignment trough to move the article from an attitude wherein the article longitudinal axis is substantially parallel to the horizontal wheel axis to an attitude substantially perpendicular to the horizontal wheel axis.

29. An apparatus for orienting lightweight articles as defined in claim 21, including; an internal receiver positioned adjacent to each trough to receive a lightweight article from its respective trough and maintain substantial parallel alignment of the article longitudinal axis to the horizontal wheel axis.

30. An apparatus for orienting lightweight articles comprising; a wheel rotatable on a substantially horizontal axis, said wheel having an intake portion for receiving randomly oriented lightweight articles, each of said articles having an article longitudinal axis, said wheel having a plurality of alignment troughs on its interior surface, each of said troughs having a longitudinal trough axis substantially parallel to the horizontal axis of the wheel, each of said troughs adapted to receive a lightweight article from the randomly oriented lightweight articles and align an article longitudinal axis of the lightweight article substantially parallel to the longitudinal trough axis of the respective trough, a hood positioned above the horizontal axis of the wheel covering a portion of the wheel to carry air away from the interior of the wheel to retain lightweight articles in their respective troughs when the troughs are above the horizontal axis of the wheel, an internal receiver positioned adjacent to each trough to receive a lightweight article from its respective trough and maintain substantial parallel alignment of the article longitudinal axis to the longitudinal trough axis of the respective trough, an external receiver aligned with each internal trough and supported on the wheel to move with the wheel, each external receiver having a transition bar engageable with an article in the external receiver to allow a bottom of the article to be selectively positioned, a source of air under pressure to flow air selectively under pressure along each alignment trough to move an article lengthwise along the trough through the internal receiver and into the external receiver, a chute mounted on the wheel adjacent to each external receiver to receive an article from the external receiver, a second source of air under pressure to apply selectively air under pressure to an article in the external receiver to assist gravity to move the article to an attitude wherein the article longitudinal axis is substantially perpendicular to the horizontal axis and into a respective chute, and a retrieval apparatus positioned adjacent to the wheel to remove from the chute an article in a vertical attitude.

* * * * *